(12) United States Patent
Takata

(10) Patent No.: US 10,974,475 B2
(45) Date of Patent: Apr. 13, 2021

(54) PRISM, FORMING MOLD, AND METHOD OF PRODUCING PRISM

(71) Applicant: CANON KABUSHIKI KAISHA, Tokyo (JP)

(72) Inventor: Atsushi Takata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 16/127,467

(22) Filed: Sep. 11, 2018

(65) Prior Publication Data

US 2019/0091954 A1   Mar. 28, 2019

(30) Foreign Application Priority Data

Sep. 22, 2017 (JP) .............................. JP2017-183030
Aug. 24, 2018 (JP) .............................. JP2018-157415

(51) Int. Cl.
| | |
|---|---|
| B29D 11/00 | (2006.01) |
| B29C 43/36 | (2006.01) |
| G02B 5/04 | (2006.01) |
| G02B 1/04 | (2006.01) |
| B29C 43/54 | (2006.01) |
| B29C 43/52 | (2006.01) |
| G02B 23/00 | (2006.01) |
| B29K 23/00 | (2006.01) |
| B29L 11/00 | (2006.01) |

(52) U.S. Cl.
CPC ...... B29D 11/00596 (2013.01); B29C 43/361 (2013.01); B29C 43/52 (2013.01); B29C 43/54 (2013.01); B29D 11/00432 (2013.01); G02B 1/04 (2013.01); G02B 5/04 (2013.01); B29C 2043/3613 (2013.01); B29C 2043/522 (2013.01); B29K 2023/00 (2013.01); B29L 2011/00 (2013.01); B29L 2011/0016 (2013.01); G02B 1/045 (2013.01); G02B 23/00 (2013.01)

(58) Field of Classification Search
CPC ........ B29D 11/00596; B29D 11/00432; G02B 5/04; G02B 1/04; B29C 43/361; B29C 43/54; B29C 43/52
See application file for complete search history.

(56) References Cited

U.S. PATENT DOCUMENTS

2016/0039130 A1*   2/2016   Goshima ............. B29C 45/0025
                                                         428/141

FOREIGN PATENT DOCUMENTS

| JP | 56-084919 | * | 7/1981 |
| JP | 2014-040060 A | | 3/2014 |

* cited by examiner

Primary Examiner — Mathieu D Vargot
(74) Attorney, Agent, or Firm — Venable LLP

(57) ABSTRACT

A forming mold for forming a prism by press molding includes a first mold, a second mold, and a third mold. The second mold includes a surface configured to form a base surface of a non-optical surface and is configured to define, together with the first mold, a space in which a material is disposed. The third mold is slidable with respect to the second mold so as to project toward the space with respect to the second mold and is configured to form a recess portion recessed with respect to the base surface.

8 Claims, 12 Drawing Sheets

PRISM, FORMING MOLD, AND METHOD OF PRODUCING PRISM

BACKGROUND OF THE INVENTION

Field of the Invention

The present invention relates to production of a prism.

Description of the Related Art

Examples of a conventional method of producing a prism include polishing a block of a material. However, this method includes many processing steps, requires a highly-precise processing technique, and thus requires high production costs. Therefore, processing techniques that reduce the production cost have been studied.

Japanese Patent Laid-Open No. 2014-040060 discloses a method of producing a molded product by press molding. According to the method of Japanese Patent Laid-Open No. 2014-040060, distortion caused by flow of resin during pressing and distortion caused by temperature distribution during cooling and solidification can be reduced by pressing a material by a heated mold and cooling the material slowly.

However, in the case of producing a prism, a sink mark is generated by cooling contraction because the prism is a thick molded product. There is a problem that the precision of optical surface of the prism decreases when a sink mark is generated in the optical surface.

SUMMARY OF THE INVENTION

According to a first aspect of the present invention, a method of producing a prism having an optical surface and a non-optical surface includes a first step of sandwiching a material by a first mold and a second mold, the second mold including a surface configured to form a base surface of the non-optical surface, a second step of pressing the material by causing a third mold to project toward the material with respect to the surface configured to form the base surface, the third mold being configured to form a recess portion recessed with respect to the base surface, and a third step of cooling the material.

According to a second aspect of the present invention, a prism includes an optical surface, and a non-optical surface. The non-optical surface includes a base surface and a recess portion recessed with respect to the base surface. The recess portion includes a bottom surface and a side wall surface.

According to a third aspect of the present invention, a forming mold for forming a prism by press molding includes a first mold, a second mold that includes a surface configured to form a base surface of a non-optical surface and is configured to define, together with the first mold, a space in which a material is disposed, and a third mold that is slidable with respect to the second mold so as to project toward the space with respect to the second mold and is configured to form a recess portion recessed with respect to the base surface.

Further features of the present invention will become apparent from the following description of exemplary embodiments with reference to the attached drawings.

DESCRIPTION OF THE EMBODIMENTS

Exemplary embodiments for implementing the present invention will be described below in detail with reference to drawings.

First Exemplary Embodiment

Figure 1A:
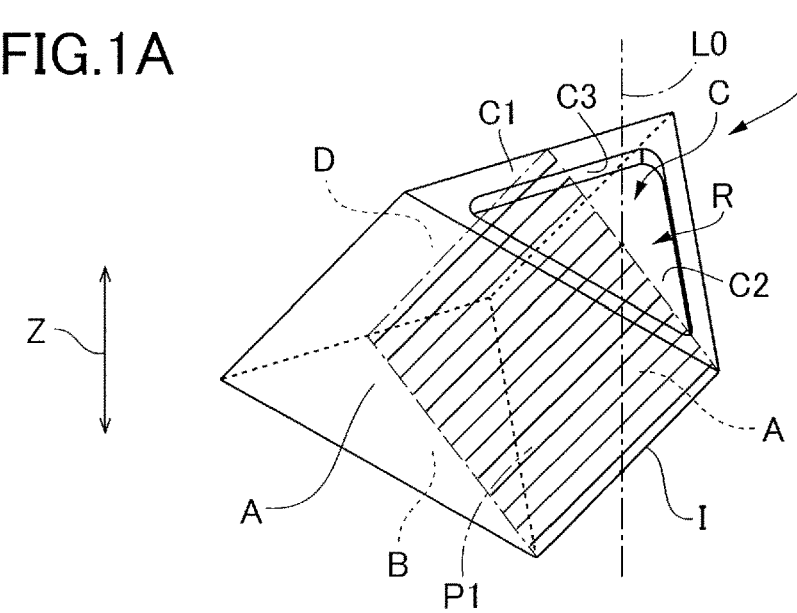
FIG. 1A is a perspective view of a prism according to a first exemplary embodiment.

FIG. 1A is a perspective view of a prism 90 according to a first exemplary embodiment. The prism 90 which is an optical element is mounted in an optical device such as binoculars or a camera. The prism 90 is, for example, a triangular prism, and has a plane-symmetrical shape with respect to a mirror symmetry plane P1. The material for the prism 90 may be glass, but is thermoplastic resin that is lighter and requires lower cost than glass.

Figure 1B:
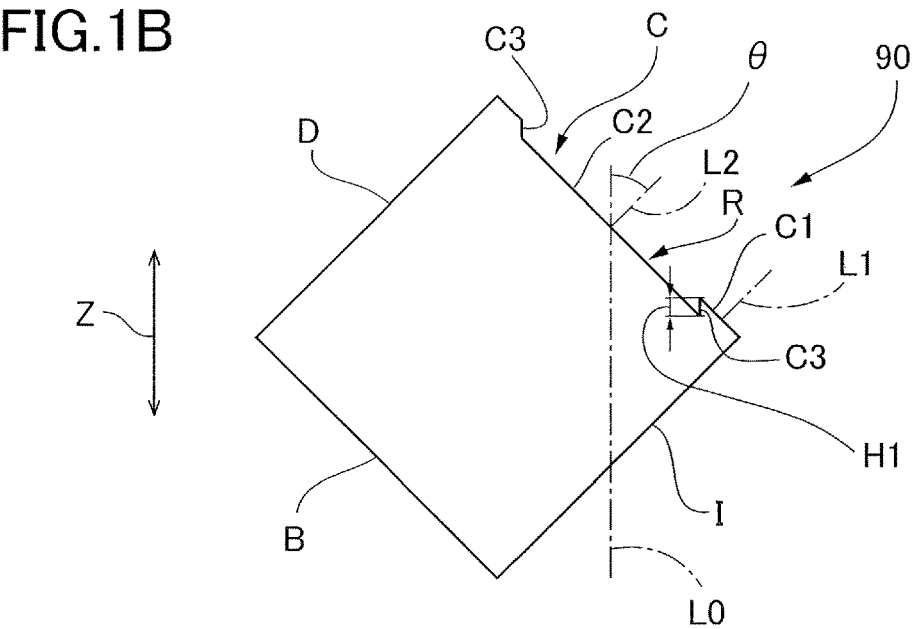
FIG. 1B is a section view of the prism according to the first exemplary embodiment.
Figure 1C:
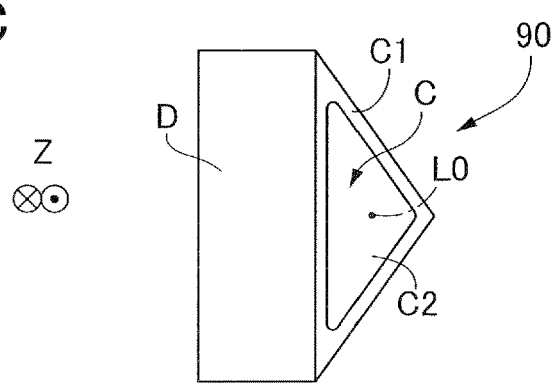
FIG. 1C is a plan view of the prism according to the first exemplary embodiment.

The prism 90 is formed in a substantially triangular prismatic shape having three optical surfaces A, A, and D, and two non-optical surfaces B and C. The optical surfaces A, A, D are side surfaces of the triangular prism, and the non-optical surfaces B and C are respectively the bottom surface and top surface of the triangular prism. In FIG. 1A, the mirror symmetry plane P1 is a virtual plane including a ridgeline I of the prism 90, an imaginary line bisecting the optical surface D, and a virtual axis L0 extending in the vertical direction Z. FIG. 1B is a section view of the prism 90 taken along the mirror symmetry plane P1. FIG. 1C is a plan view of the prism 90 as viewed in the direction in which the virtual axis L0 extends.

The optical surfaces A, A, and D and the non-optical surface B are flat surfaces, and the non-optical surface C includes a base surface C1 that is a flat surface and a recess portion R recessed with respect to the base surface C1. The recess portion R includes a substantially flat bottom surface C2 and side wall surfaces C3 erected so as to surround the bottom surface C2. The non-optical surface B, and the base surface C1 and the bottom surface C2 of the non-optical surface C are parallel. In addition, the optical surfaces A, A, and D are perpendicular to, that is, are at a right angle with respect to the non-optical surface B, and the base surface C1 and the bottom surface C2 of the non-optical surface C. An angle formed by the two optical surfaces A is 90°, and an angle formed by the optical surface D and each of the optical surfaces A is 45°.

To be noted, the base surface C1 and the bottom surface C2 are parallel to each other. Therefore, a normal L1 to the base surface C1 and a normal L2 to the bottom surface C2 are parallel to each other. That is, the normals L1 and L2 extend in the same direction. An angle formed by the virtual axis L0 and each of the normals L1 and L2 will be referred to as an angle θ. There are two angles formed by the virtual axis L0 and each of the normals L1 and L2 that make up a total angle of 180°, that is, an acute angle and an obtuse angle, and the angle θ is the acute angle. The virtual axis L0 is a line that coincides with a pressing axis of a forming mold when the prism 90 is in the forming mold.

Figure 2A:
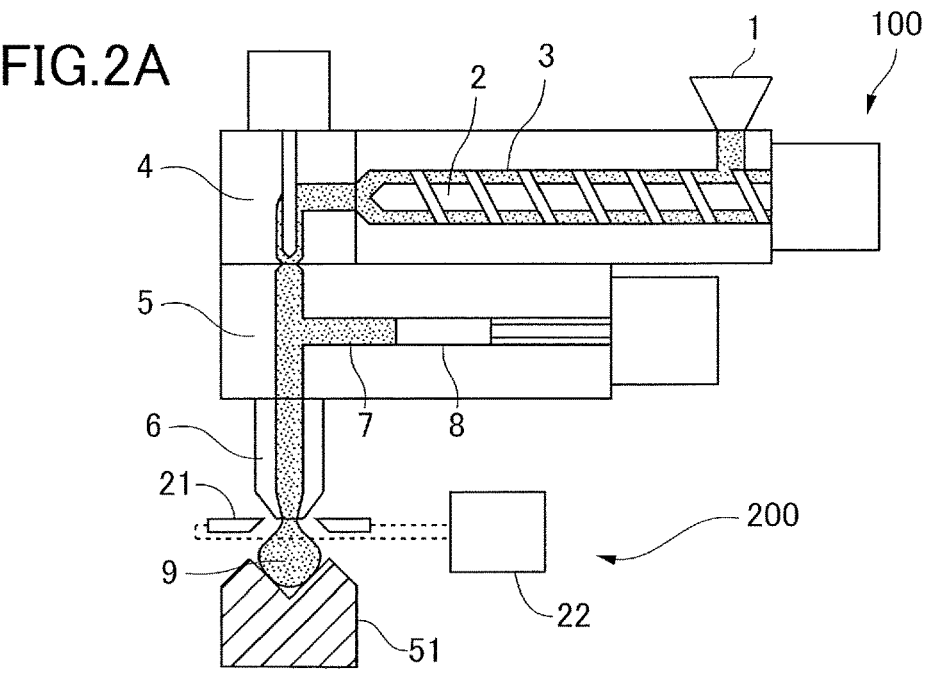
FIG. 2A is an explanatory diagram illustrating an ejection apparatus and a cutting apparatus used for producing the prism according to the first exemplary embodiment.
Figure 2B:
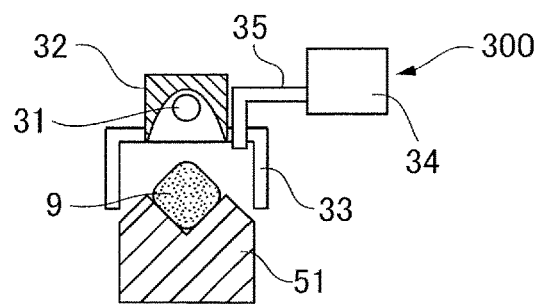
FIG. 2B is an explanatory diagram illustrating a heating apparatus used for producing the prism according to the first exemplary embodiment.
Figure 2C:
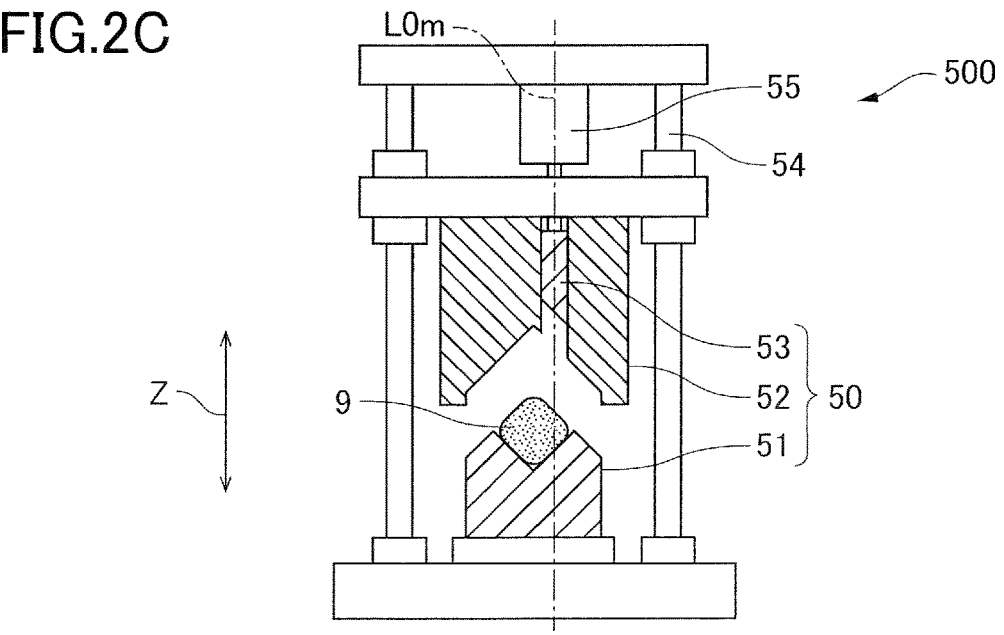
FIG. 2C is an explanatory diagram illustrating a pressing apparatus used for producing the prism according to the first exemplary embodiment.

FIG. 2A is an explanatory diagram illustrating an ejection apparatus 100 and a cutting apparatus 200 used for producing the prism 90 according to the first exemplary embodiment. FIG. 2B is an explanatory diagram illustrating a heating apparatus 300 used for producing the prism 90 according to the first exemplary embodiment. FIG. 2C is an explanatory diagram illustrating a pressing apparatus 500 used for producing the prism 90 according to the first exemplary embodiment. A production system for producing the prism 90 is constituted by the ejection apparatus 100 and the cutting apparatus 200 illustrated in FIG. 2A, the heating apparatus 300 illustrated in FIG. 2B, and the pressing apparatus 500 illustrated in FIG. 2C.

The ejection apparatus 100 illustrated in FIG. 2A includes a hopper 1 and a screw 2 serving as a plasticizing portion. A thermoplastic resin that becomes a material 9 for the prism 90 is put in the hopper 1. The thermoplastic resin put in the hopper 1 is a solidified resin material, and is formed as, for example, pellets of several millimeters large that are easy to handle. The screw 2 heats and kneads the thermoplastic resin put in the hopper 1 to plasticize the thermoplastic resin.

In addition, the ejection apparatus 100 includes a barrel 3 that accommodates the screw 2. The barrel 3 is provided in connection with an upper manifold 4, a lower manifold 5, and a nozzle 6. In the upper manifold 4, a flow path for molten resin supplied from the screw 2 is defined. The lower manifold 5 is provided with a pressurizing chamber 7 for pressurizing the molten resin such that the molten resin is ejected through the nozzle 6.

In addition, the ejection apparatus 100 includes a plunger 8 slidably provided in the pressurizing chamber 7. The plunger 8 is capable of precise forward and backward movement, and presses the molten resin injected in the pressurizing chamber 7. By the operation of the plunger 8, the molten resin injected in the pressurizing chamber 7 is ejected downward through the nozzle 6. The ejected material 9 is received by a lower mold 51 to form a molten resin lump.

To be noted, although the ejection apparatus 100 is a plasticizing injection apparatus of a screw preplasticating type used for injection molding, the ejection apparatus 100 may be a plasticizing injection apparatus of an in-line screw type, and may be of any ejection system as long as the amount of ejection of molten resin is constant. In addition, the shape and material for the nozzle, the ejection speed, and the like may be determined in accordance with the purpose.

The cutting apparatus 200 illustrated in FIG. 2A includes a cutting jig 21 disposed near the nozzle 6 and a driving portion 22 that drives the cutting jig 21, and cuts off the material 9 continuing downward from the nozzle 6. For example, the cutting jig 21 is a cutter including a pair of blades. For example, the cutting apparatus 200 is an air nipper.

The heating apparatus 300 illustrated in FIG. 2B includes a halogen heater 31, a reflective mirror 32, and a cover 33. The halogen heater 31 serves as a heat source. The reflective mirror 32 is disposed so as to cover the outer periphery of the halogen heater 31. The cover 33 encloses a space between the reflective mirror 32 and the lower mold 51. The reflective mirror 32 is formed such that reflected light is focused right under the reflective mirror 32. In the case where a part of the material 9 is disposed at or near the position where the reflected light from the reflective mirror 32 is focused, the part can be locally heated. The heating apparatus 300 includes an inert gas supply source 34 and a nozzle 35 through which an inert gas such as a nitrogen gas or an argon gas is discharged to the vicinity of the material 9 disposed in the heating apparatus 300, and maintains an inert gas atmosphere inside the cover 33.

The pressing apparatus 500 illustrated in FIG. 2C is an apparatus for press molding, and includes a forming mold 50. The forming mold 50 is a mold for molding a prism, and includes the lower mold 51 serving as a first mold, a body mold 52 serving as a second mold, and an upper mold 53 serving as a third mold. The pressing apparatus 500 includes a movement guide 54, a driving portion 55, and an unillustrated driving portion. The movement guide 54 guides the body mold 52 and the upper mold 53 in the vertical direction Z in which a pressing axis L0m extends. The driving portion 55 drives the upper mold 53 in the vertical direction Z, and the unillustrated driving portion drives the body mold 52 in the vertical direction. The material 9 can be subjected to press molding by moving the lower mold 51 on which the material 9 is placed to a position opposing the body mold 52 and the upper mold 53 in the vertical direction Z and moving down the body mold 52 and the upper mold 53. The pressing axis L0m is a virtual line passing through the center of the driving portion 55. That is, the press molding is performed by moving down the upper mold 53 along the pressing axis L0m.

The lower mold 51 can be sequentially conveyed to the ejection apparatus 100, the heating apparatus 300, and the pressing apparatus 500. The lower mold 51 serves as a common receiving plate on which the material 9 is placed in the ejection apparatus 100 and the heating apparatus 300 and serves as a part of the forming mold 50 in the pressing apparatus 500. The lower mold 51 is conveyed by an unillustrated conveyance apparatus, for example, a robot. In the present exemplary embodiment, the pressing apparatus 500 is disposed in a production line separately from the ejection apparatus 100, and a plurality of lower molds 51 are sequentially conveyed to the respective apparatuses 100, 300, and 500. In this manner, by conveying the lower mold 51 as a common receiving plate, production can be performed continuously, and thus mass production of the prism 90 becomes possible, leading to improvement of the productivity of the prism 90.

Figure 3:
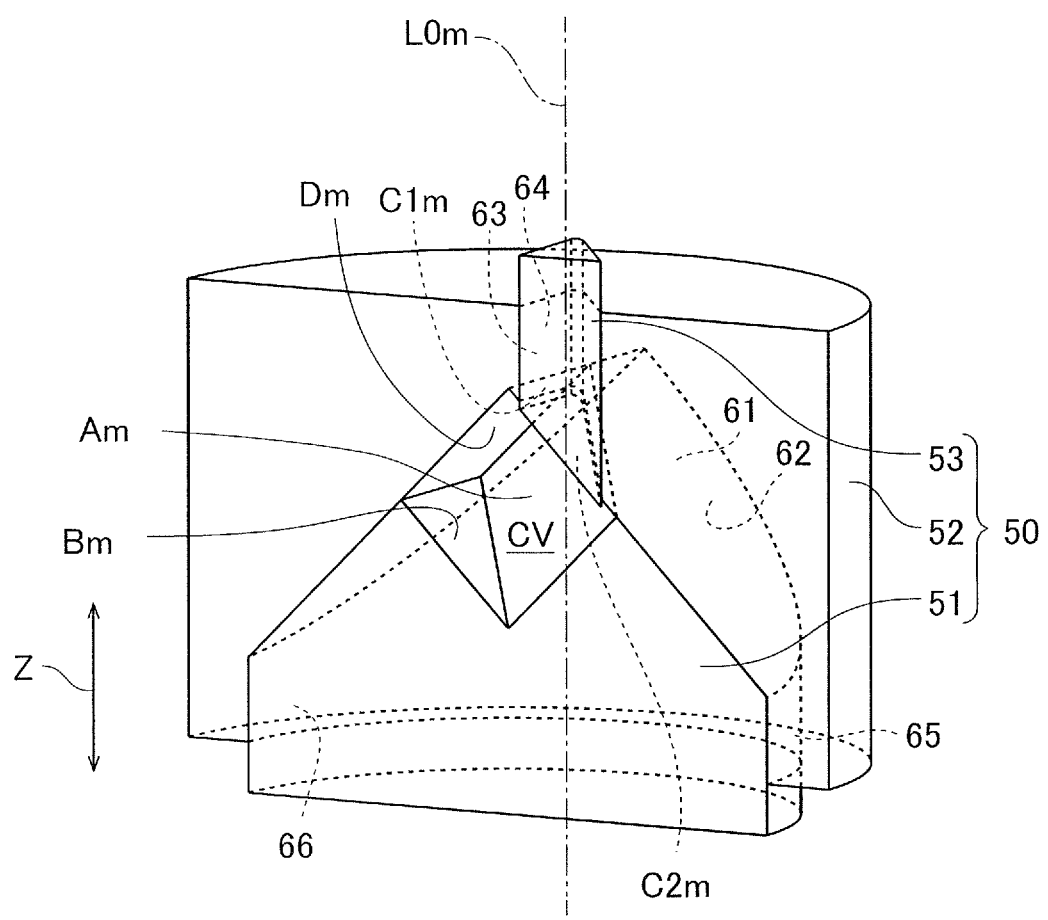
FIG. 3 is a perspective view of one of a pair of cut pieces into which a forming mold according to the first exemplary embodiment is cut.

FIG. 3 is a perspective view of one of a pair of cut pieces into which the forming mold 50 according to the first exemplary embodiment. FIG. 3 illustrates a case where the forming mold 50 is cut along a mirror symmetry plane including the pressing axis L0m and bisecting a cavity CV. This mirror symmetry plane corresponds to the mirror symmetry plane P1 of FIG. 1A. The cavity CV is a space in which the material 9 is disposed such that the shape of the prism 90 is transferred to the material 9. To be noted, in a state in which the prism 90 is disposed in the cavity CV of the forming mold 50, the virtual axis L0 illustrated in FIG. 1A and the pressing axis L0m coincide with each other.

Figure 4A:
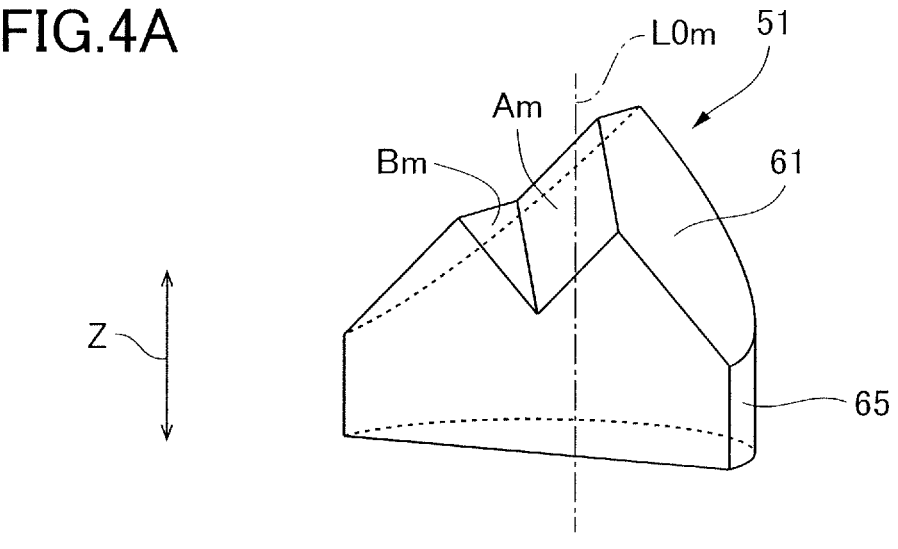
FIG. 4A is a perspective view of one of a pair of cut pieces into which a lower mold according to the first exemplary embodiment is cut.
Figure 4B:
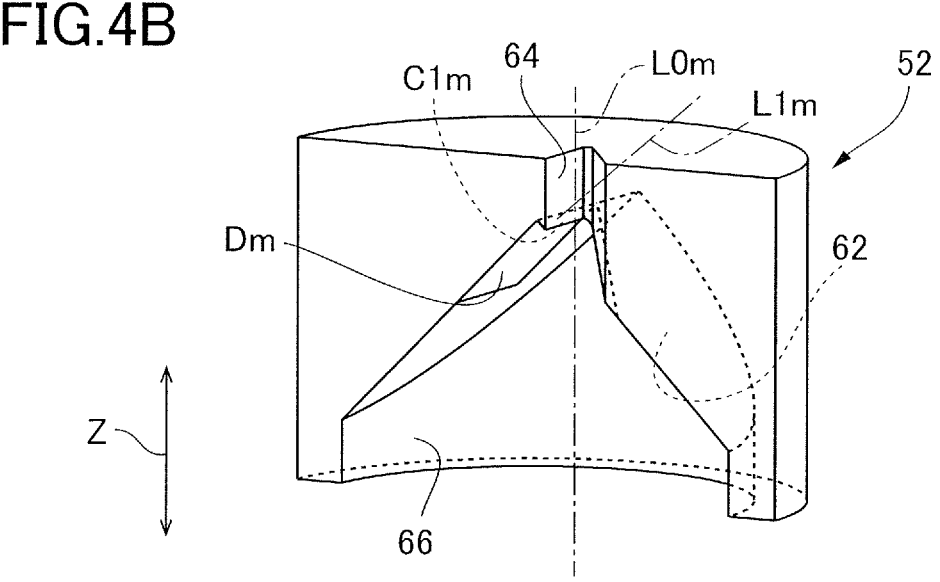
FIG. 4B is a perspective view of one of a pair of cut pieces into which a body mold according to the first exemplary embodiment is cut.
Figure 4C:
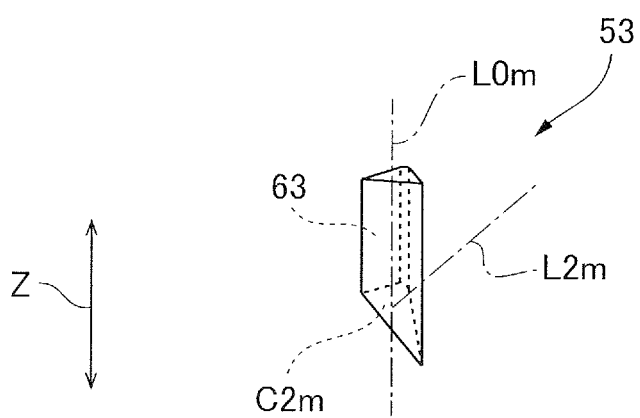
FIG. 4C is a perspective view of one of a pair of cut pieces into which an upper mold according to the first exemplary embodiment is cut.

FIG. 4A is a perspective view of one of a pair of cut pieces into which the lower mold 51 is cut. FIG. 4B is a perspective view of one of a pair of cut pieces into which the body mold 52 is cut. FIG. 4C is a perspective view of one of a pair of cut pieces into which the upper mold 53 is cut. Also in FIGS. 4A to 4C, each mold cut along the mirror symmetry plane is illustrated similarly to FIG. 3.

The lower mold 51 includes optical surfaces Am and a non-optical surface Bm as illustrated in FIG. 4A. The optical surfaces Am form the optical surfaces A of the prism 90, and the non-optical surface Bm forms the non-optical surface B of the prism 90. In addition, the lower mold 51 includes an abutting surface 61 and a slide contact surface 65.

The body mold 52 includes an optical surface Dm and a surface C1m as illustrated in FIG. 4B. The optical surface Dm forms the optical surface D of the prism 90, and the surface C1m forms the base surface C1 that is a part of the non-optical surface C of the prism 90. In addition, the body mold 52 includes an abutting surface 62, and slide contact surfaces 64 and 66.

The upper mold 53 forms the recess portion R that is the other part of the non-optical surface C of the prism 90, and is slidable in the vertical direction Z with respect to the body mold 52. The upper mold 53 includes a pressing surface C2m and a slide contact surface 63 continuous from the pressing surface C2m as illustrated in FIG. 4C. The pressing surface C2m forms the bottom surface C2 of the recess portion R. The periphery of the pressing surface C2m is formed by straight lines and arcs, and has such a shape that the slide contact surface 63 can be processed with a high precision.

As illustrated in FIG. 3, the slide contact surfaces 63, 64, 65, and 66 are surfaces extending in a direction parallel to the pressing axis L0m, that is, in the vertical direction Z. By moving the body mold 52 in the vertical direction Z with respect to the lower mold 51, the slide contact surface 65 of the lower mold 51 and the slide contact surface 66 of the body mold 52 are brought into slide contact with each other. In addition, by moving the upper mold 53 in the vertical direction Z with respect to the body mold 52, the slide contact surface 64 of the body mold 52 and the slide contact surface 63 of the upper mold 53 are brought into slide contact with each other. The abutting surface 62 is formed in such a shape as to overlap the abutting surface 61.

The body mold 52 comes into slide contact with the slide contact surface 65 of the lower mold 51 and slides in the vertical direction Z with respect to the lower mold 51, and thus the axis of the body mold 52 is aligned with the pressing axis L0m. In addition, the body mold 52 is positioned in the vertical direction Z as a result of the abutting surface 62 abutting the abutting surface 61 of the lower mold 51. The upper mold 53 comes into slide contact with the slide contact surface 64 of the body mold 52 and slides in the vertical direction Z with respect to the body mold 52, and thus the axis of the upper mold 53 is aligned with the pressing axis L0m. In addition, by sliding the upper mold 53 with respect to the body mold 52, pressing pressure is transmitted to the material 9 through the pressing surface C2m, and thus the respective surfaces Am, Am, Bm, Cm, and Dm are transferred.

The optical surfaces Am, the non-optical surface Bm, the surface C1m of the non-optical surface Cm, the pressing surface C2m, and the optical surface Dm are all inclined surfaces inclined with respect to the pressing axis L0m. That is, the surface C1m and the pressing surface C2m are inclined surfaces inclined with respect to the slide contact surface 63. In addition, the body mold 52 and the upper mold 53 are disposed such that the surface C1m and the pressing surface C2m are parallel. That is, a normal L1m to the surface C1m and a normal L2m to the surface C2m are parallel. In other words, the normal L1m and the normal L2m extend in the same direction. An angle formed by the pressing axis L0m and each of the normals L1m and L2m matches the angle θ illustrated in FIG. 1B.

Figure 5:
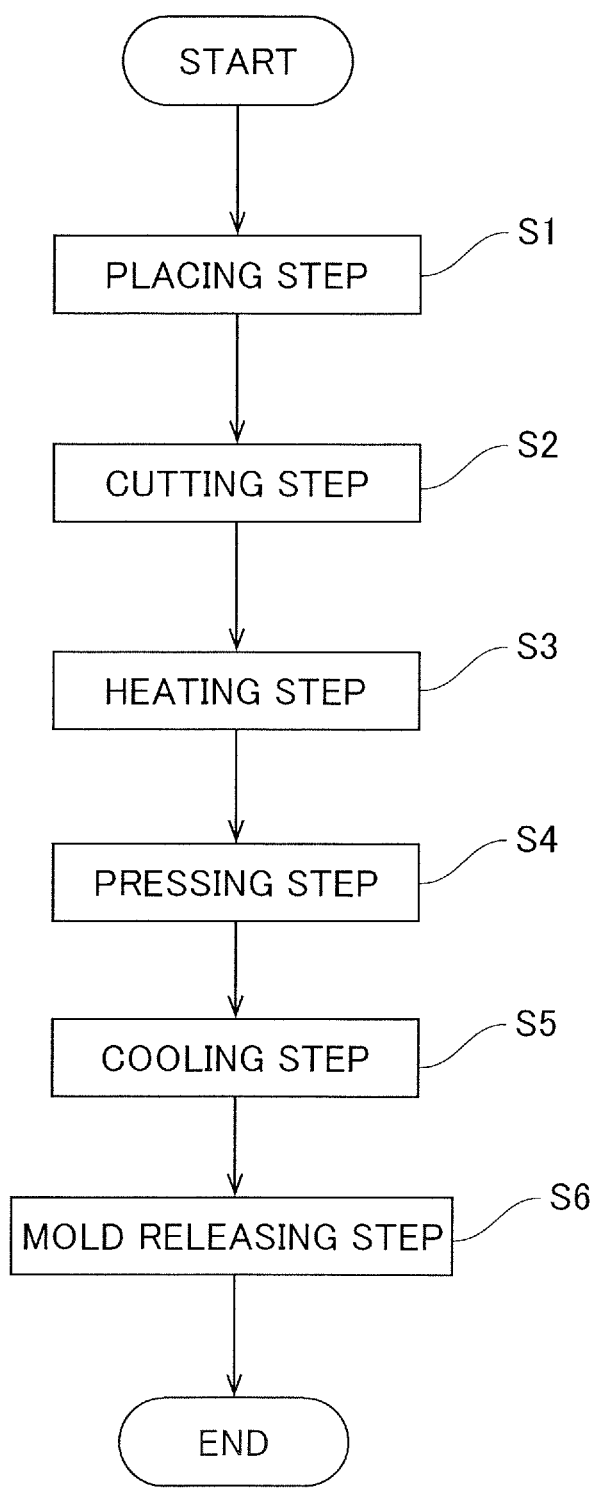
FIG. 5 is a flowchart illustrating each step of a method of producing the prism according to the first exemplary embodiment.

Next, a method of producing the prism 90 by using the production system described above will be described in detail. FIG. 5 is a flowchart illustrating each step of the method of producing the prism 90. As illustrated in FIG. 5, the prism 90 is produced through a placing step S1, a cutting step S2, a heating step S3, a pressing step S4, a cooling step S5, and a mold releasing step S6. Each step will be described in detail below. To be noted, although a case where a cyclo-olefin polymer: CPO resin is used as the thermoplastic resin will be described as an example below, the thermoplastic resin is not limited to this material. For example, ZEONEX E48R manufactured by Zeon Corporation having a glass transition temperature Tg of 140° C. is used as the COP resin.

First, in the placing step S1, as illustrated in FIG. 2A, the lower mold 51 is moved to a position under the nozzle 6 by the unillustrated conveyance apparatus, and the molten material 9 is ejected through the nozzle 6 to the lower mold 51. Specifically, the COP resin is plasticized at a temperature of Tg+50° C. to Tg+150° C. and ejected to the lower mold 51 in the ambient atmosphere by the ejection apparatus 100. Examples of a material of the lower mold 51 include stainless steel, coppery alloy, and cemented carbide.

The lower mold 51 needs to be at a high temperature such that a trace of resin flow derived from ejection does not remain after the molten resin comes into contact with the lower mold 51. In the first exemplary embodiment, the lower mold 51 is heated to and maintained at a temperature of Tg+10° C. to Tg+150° C., for example, 180° C. In the conveyance apparatus, a part that holds the lower mold 51 needs to be thermally insulated such that the lower mold 51 is not quickly cooled down when the part comes into contact with the lower mold 51. For example, polyether ether ketone: PEEK resin, which has high heat resistance and low thermal conductivity, is used as the material of the part that holds the lower mold 51.

Since the prism 90 to be molded is thick, the material 9 of an amount required for molding the shape thereof needs to be ejected into a shape overall close to the shape of the prism 90. In the case where the lower mold 51 overflows with the material 9, the resin is sandwiched between the abutting surface 61 of the lower mold 51 and the abutting surface 62 of the body mold 52 in the pressing step S4, and burr, which is a molding defect, is formed on the resulting prism. In the first exemplary embodiment, the material 9 is ejected while moving the lower mold 51 downward and horizontally. The material 9 can be ejected into a desired shape by adjusting the motion of the lower mold 51 and the ejection speed of the material 9.

In the case where the ambient environment is a normal atmosphere, the environmental temperature is lower than Tg of the molten resin, and therefore the ejected material 9 is cooled by the atmosphere. In particular, the surface of the material 9 gradually solidifies. By making the temperature of the ambient environment closer to or higher than Tg of the material 9, the solidification of the surface of the material 9 can be retarded. In addition, in the case where the material 9 is oxidized by oxygen in the atmosphere and is degraded, this can be prevented by surrounding the material 9 by an airtight container or the like and putting the material 9 in an inert gas atmosphere, for example, a nitrogen atmosphere.

After the placing step S1 is finished, supply of the material 9 from the nozzle 6 is stopped, and the material 9 is continuous from the nozzle 6 due to the viscosity of the material 9. On the basis of the relationship between the viscosity and the specific gravity, the thermoplastic resin cannot be cut spontaneously, that is, cannot be cut without being sheared, unlike glass. Therefore, the material 9 dangles from the tip of the nozzle 6.

Therefore, in the first exemplary embodiment, in the cutting step S2, the cutting jig 21 is driven by the driving portion 22 illustrated in FIG. 2A, and thus the material 9 is cut off the nozzle 6. In this manner, the material 9 having a tapered projection shape in an upper portion thereof can be obtained by cutting off, by the cutting apparatus 200, the material 9 ejected onto the lower mold 51. An appropriate cutting jig 21 may be selected from one having a sharp cutting edge and one that holds and pulls down the resin to cut the resin. The cutting jig 21 of the cutting apparatus 200 may be heated by an unillustrated heater for use. However, since the molten resin sticks to the cutting jig 21 when the temperature of the cutting jig 21 is too high, the cutting jig 21 should be heated to a temperature not high enough to cause the sticking.

After the cutting step S2 described above is finished, the material 9 is placed on the lower mold 51. An upper portion of the material 9 is a tapered projection portion generated in the cutting step S2. At the tip end of the projection portion, which is a cut part, a cutting trace formed by the cutting jig 21 remains. The temperature of the material 9 starts being reduced by contact with the air, and thus the viscosity of the material 9 increases and the flexibility of the shape of the material 9 gradually decreases. Since the material 9 includes the projection portion and the projection portion includes the cutting trace at the tip end thereof, the shape of the projection portion needs to be corrected to obtain a good prism 90.

Therefore, the projection portion of the material 9 placed on the lower mold 51 is locally heated in the heating step S3. The heating step S3 will be described in detail below. As illustrated in FIG. 2B, the lower mold 51 on which the material 9 is placed is moved to the heating apparatus 300 by the unillustrated conveyance apparatus. The lower mold 51 is moved by the conveyance apparatus such that the halogen heater 31 is positioned above the projection portion of the material 9, specifically, such that the tip end of the projection portion of the material 9 is positioned near the focal point of infrared light radiated from the halogen heater 31. By causing the halogen heater 31 to perform heating operation in this state, the infrared light is focused on the tip end of the projection portion, and thus the tip end of the projection portion is locally heated out of contact with the heating apparatus 300.

The projection portion of the material 9 gradually disappears due to resin flow when heated. By moving down the halogen heater 31 in accordance with the disappearance to adjust the position of the halogen heater 31 such that the infrared light is always focused on the tip end of the projection portion of the material 9, the material 9 whose cutting trace and projection portion is removed can be smoothly obtained in a short time. To be noted, since heating the material 9 by a contact method such as pressing a mold against the material 9 causes sticking of the resin to the heating apparatus, it is better to perform heating contactlessly as in the present exemplary embodiment.

In addition, in the case where a configuration in which the halogen heater 31 is not moved and the infrared light is focused on, for example, the root of the projection portion of the material 9 in the heating operation is employed, sometimes the viscosity in the vicinity of the root of the projection portion locally decreases and the projection portion falls over, causing a transfer defect of forming surface. In addition, in this case, the irradiation time of the infrared light required for removing the projection portion is increased, causing an appearance defect such as yellowing. In the present exemplary embodiment, by locally heating the tip end of the projection portion while moving the halogen heater 31, the appearance defect can be suppressed, overall resin flow of the material 9 can be suppressed, and overflow of the lower mold 51 with the material 9 can be prevented. To be noted, the heating time of the material 9 by the halogen heater 31 is about 20 seconds.

Although the halogen heater 31 has been described as an example of a heat source in the description above, the heat source is not limited to this as long as the heat source is capable of radiation heating of the material 9. For example, a carbon heater, a mid-infrared light heater, or a far-infrared light heater may be used. These heaters are capable of heating the COP resin similarly to a halogen heater. In addition, instead of disposing the halogen heater 31 above the material 9, the halogen heater 31 may be disposed beside the material 9 to heat the projection portion of the material 9 from the side or the projection portion may be heated circumferentially by using a ring-shaped heat source.

Incidentally, chemical reaction of the resin is promoted and the resin becomes more likely to be modified when the resin is heated. Particularly, in an environment in which sufficient oxygen is present around the material 9 when the material is heated, there is a high possibility that the resin component is modified by oxidation. Therefore, in the present exemplary embodiment, in the heating step S3, inside the cover 33 is filled with an inert gas such as a nitrogen gas or an argon gas by the inert gas supply source 34 to prevent the material 9 from being oxidized and degraded due to the increase in temperature by the heating. As a result of this, the material 9 can be maintained in an inert gas atmosphere, and thus oxidation of the material 9 can be prevented.

To be noted, although a case where the material 9 that is molten resin is ejected onto the lower mold 51 in the placing step S1 has been described in the first exemplary embodiment, the configuration is not limited to this. For example, a near-shape gob of the prism 90 or a resin block may be used as the material 9. In this case, a heating step of heating the whole resin to a molten state may be performed instead of the cutting step S2 and the heating step S3.

Figure 6A:
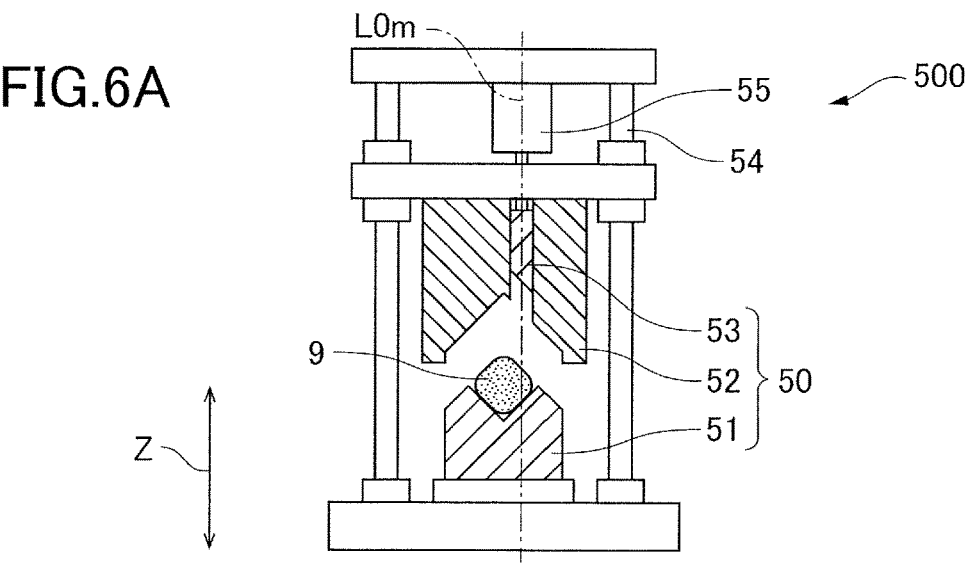
FIGS. 6A to 6C are each an explanatory diagram of a pressing step according to the first exemplary embodiment.
Figure 6B:
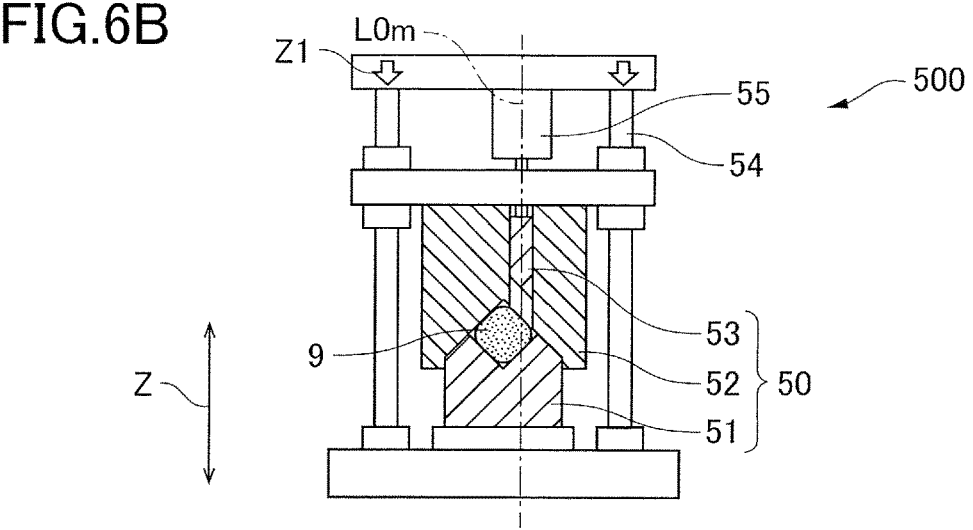
Figure 6C:
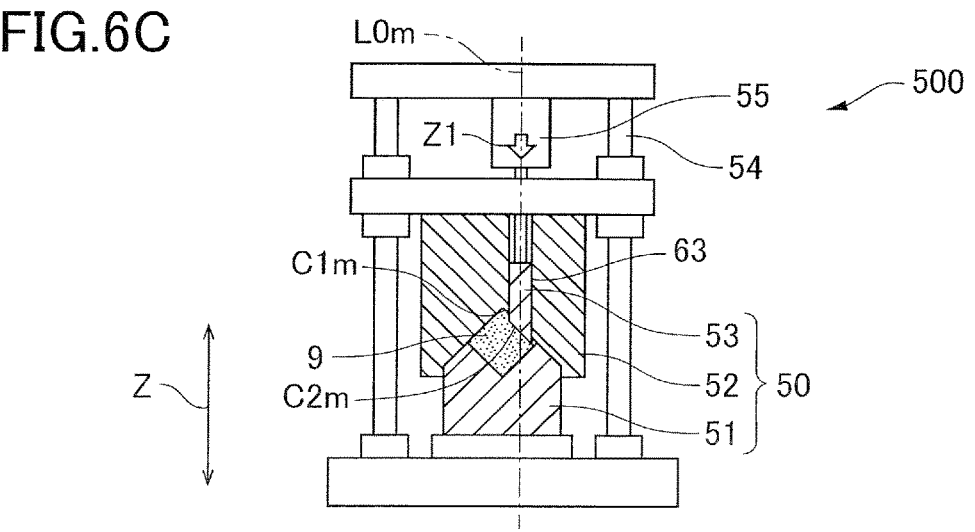

Next, the pressing step S4 will be described. FIGS. 6A to 6C are each an explanatory diagram of the pressing step S4. First, as illustrated in FIG. 6A, the lower mold 51 and the material 9 are disposed under the body mold 52 and the upper mold 53 whose temperatures are controlled. Next, as illustrated in FIG. 6B, the body mold 52 and the upper mold 53 are moved in a downward direction Z1 toward the lower mold 51 by the movement guide 54. This step serves as a first step. As a result of this, the lower mold 51 and the body mold 52 sandwich the material 9. The upper mold 53 is retracted so as not to project toward the material 9 with respect to the body mold 52. By engaging the lower mold 51 with the body mold 52, the slide contact surface 65 of the lower mold 51 and the slide contact surface 66 of the body mold 52 are brought into slide contact with each other, and axes thereof are aligned as illustrated in FIG. 3. Further, the abutting surface 61 of the lower mold 51 abuts the abutting surface 62 of the body mold 52, and the lower mold 51 and the body mold 52 are positioned in the vertical direction Z. In this state, the transfer of the optical surfaces Am and Dm onto the material 9 is not completed.

Next, as illustrated in FIG. 6C, the upper mold 53 is slid in the downward direction Z1 with respect to the body mold 52 to project toward the material 9 with respect to the surface C1m of the body mold 52, and the material 9 is pressed by the upper mold 53 at a predetermined pressure to perform shape transfer. This step serves as a second step. The pressing pressure at this time is, for example, 5 MPa. At this time, the material 9 is pressed by sliding the upper mold 53 with respect to the body mold 52 in the direction of the pressing axis L0m inclined with respect to the normal L1m to the surface C1m illustrated in FIG. 4B. Specifically, the material 9 is pressed by projecting a part of the slide contact surface 63 and the whole of the pressing surface C2m toward the material 9 with respect to the surface C1m in a state in which the pressing surface C2m is parallel to the surface C1m. At this time, the material 9 is pressed in a state in which the pressing surface C2m is perpendicular to the surfaces Am and Dm illustrated in FIG. 3 that form the optical surfaces A and D.

In the case where the temperatures of the upper mold 53 and the body mold 52 are too low when pressing the material 9, the surface of the material 9 is quickly cooled down, and a transfer defect occurs. Conversely, in the case where the temperatures of the upper mold 53 and the body mold 52 are too high, the resin gets into the clearance between the molds, and burr that is a molding defect occurs. In the first exemplary embodiment, the temperatures of the body mold 52 and the upper mold 53 at the start of press molding are set to a value from Tg+10° C. to Tg+50° C., for example, 170° C., which is Tg+30° C. As a result of this, the prism 90 having a highly precise optical surface can be obtained.

Since part of the slide contact surfaces 63 of the upper mold 53 are transferred as the side wall surfaces C3 of the prism 90 as illustrated in FIG. 1A, opposing side wall surfaces C3 are parallel to each other as illustrated in FIG. 1B. In addition, also in the case where the prism 90 is not cut along the mirror symmetry plane P1 as illustrated in FIG. 1B, the side wall surfaces C3 are inclined with respect to the base surface C1 and the opposing side wall surfaces C3 are parallel to each other in an arbitrary section that is perpendicular to the base surface C1 of the non-optical surface C and passes through the recess portion R.

In the cooling step S5 serving as a third step, the resin is cooled to solidify by gradually reducing the temperature in a state in which the material 9 is pressed by the lower mold 51, the body mold 52, and the upper mold 53. The forming mold 50 is cooled down such that the temperature of the forming mold 50 is reduced to a value lower than the glass transition temperature Tg of the material 9. For example, the forming mold 50 is cooled down to 120° C., which is Tg−20° C., over 7 minutes. At this time, in a cooling process of reducing the temperature of the forming mold 50 to the value lower than the glass transition temperature Tg of the material 9, temperature control is performed such that temperature difference of the upper mold 53 from the lower mold 51 and the body mold 52 is a value from +5° C. to +25° C., for example, +15° C. That is, the cooling is performed while imparting temperature difference between the lower mold 51, the body mold 52, and the upper mold 53 such that the temperature of the upper mold 53 is maintained at a temperature higher than the temperatures of the lower mold 51 and the body mold 52. As a result of this, solidification of the bottom surface C2 formed by the upper mold 53 can be retarded, and a sink mark caused by cooling contraction can be effectively guided to the recess portion R of the non-optical surface C. As a result of this, the prism 90 having a highly precise optical surface can be formed.

The temperature control of the lower mold 51, the body mold 52, and the upper mold 53 is performed by using an unillustrated temperature control mechanism. The temperature control mechanism is constituted by a combination of heaters, cooling water pipes, air blowers, and the like, and the elements thereof are independently controlled for each of the lower mold 51, the body mold 52, and the upper mold 53. By slowly cooling the material 9 by controlling the temperature of the lower mold 51, the body mold 52, and the upper mold 53, the prism 90 having smaller internal distortion such as graded index: GI and birefringence can be obtained. The GI indicates an uneven distribution of refractive index.

Figure 7A:
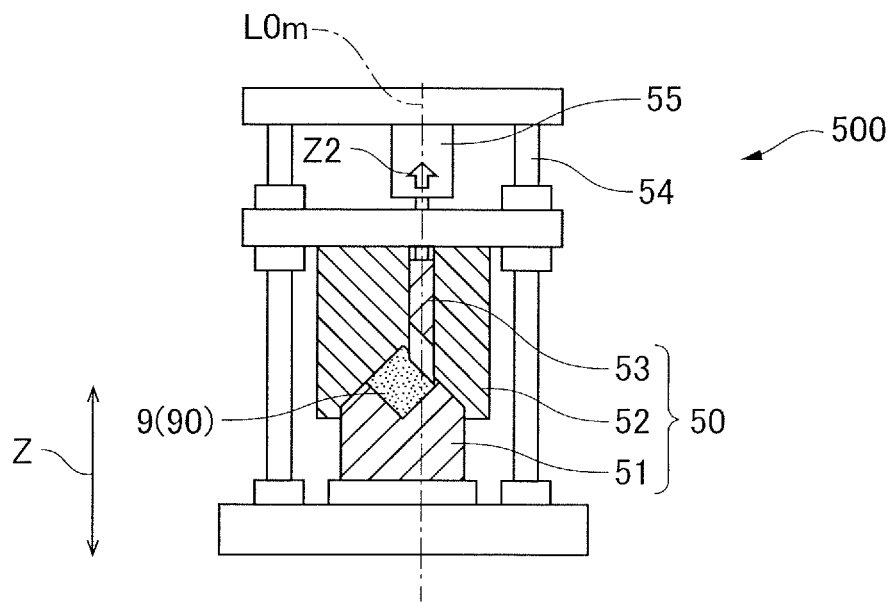
FIGS. 7A and 7B are each an explanatory diagram of a mold releasing step according to the first exemplary embodiment.
Figure 7B:
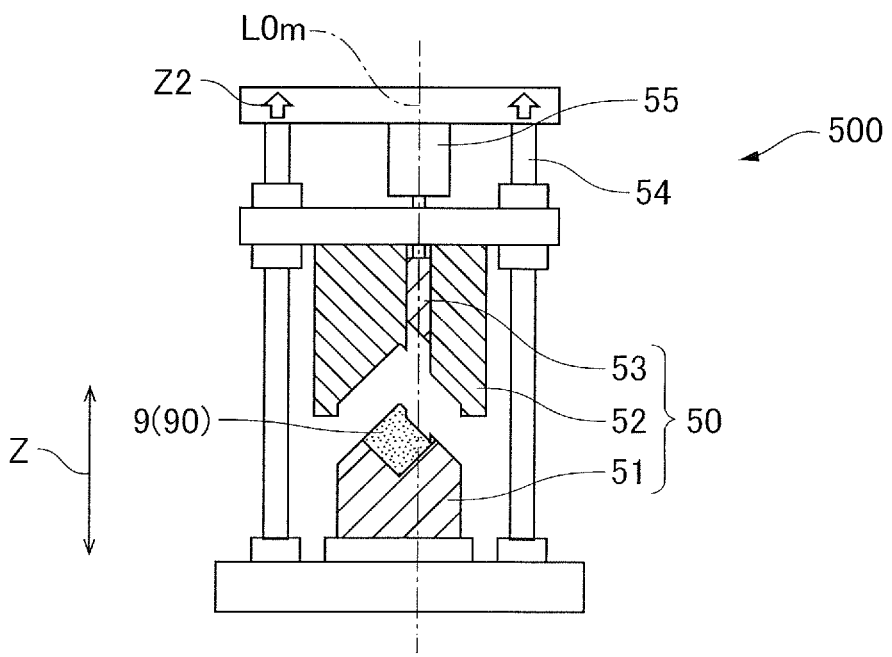

Next the mold releasing step S6 serving as a fourth step will be described. FIGS. 7A and 7B are explanatory diagrams of the mold releasing step S6. When the temperature of the material 9 and the forming mold 50 reaches the temperature lower than Tg, for example, Tg−20° C., pressing and cooling are stopped. As illustrated in FIG. 7A, the upper mold 53 is first moved in an upward direction Z2 to be separated from the material 9, or the prism 90. Then, as illustrated in FIG. 7B, the body mold 52 is moved in the upward direction Z2 to be separated from the material 9, or the prism 90. As a result of this, the material 9 or the prism 90 sticking to the upper mold 53 when opening the forming mold 50 in the mold releasing step S6 can be suppressed.

Lastly, the lower mold 51 on which the material 9 or the prism 90 is placed is taken out by the unillustrated conveyance apparatus, and then the material 9 or the prism 90 is taken out from the lower mold 51 to obtain the prism 90 illustrated in FIGS. 1A to 1C.

As illustrated in FIG. 1A, the recess portion R recessed with respect to the base surface C1 is formed in the non-optical surface C of the prism 90 in the prism 90 produced through the steps described above. That is, in the forming mold 50 during press molding as illustrated in FIG. 6C, the upper mold 53 projects with respect to the body mold 52. Although the weight or the volume of the material 9 slightly varies for each molded product, by forming the recess portion R by pressing part of the non-optical surface C, the variation of weight is absorbed as variation of the depth of the recess portion R. Further, sink marks can be concentrated at the bottom surface C2 of the recess portion R in the non-optical surface C. Therefore, the variation of weight of the material 9 does not affect the precision of the optical surfaces A, A, and D of the prism 90. That is, the optical surfaces A, A, and D of the prism 90 can be formed with a high precision. As described above, the bottom surface C2 of the prism 90 to be formed is a surface for attracting a sink mark, and slightly recessed in a concave shape. The amount of recess of the bottom surface C2 originating from the sink mark is about several μm.

A height H1 of the side wall surfaces C3 constituting the recess portion R in the vertical direction Z in which the virtual axis L0 extends will be described. The height H1 of the side wall surfaces C3 is preferably 0.05 mm or larger in consideration of the variation of weight of the material 9, rounding of edges to prevent chipping of the upper mold 53, and preventing burr from formed on the non-optical surface C. Conversely, since the optically effective area and mold releasing resistance of the triangular prism is affected in the case where the height H1 of the side wall surfaces C3 is too large, the height H1 of the side wall surfaces C3 is preferably 5 mm or smaller. That is, the height H1 of the side wall surfaces C3 is preferably 0.05 mm to 5 mm, and more preferably 0.5 mm.

In the forming mold 50, in the step illustrated in FIG. 6C, the amount of projection of the pressing surface C2m of the upper mold 53 with respect to the surface C1m of the body mold 52 in the direction in which the pressing axis L0m extends, that is, the downward direction Z1 may be 0.05 mm to 5 mm, for example, 0.5 mm.

A lower limit value of the angle θ formed by the virtual axis L0 and the normal L2 to the bottom surface C2, that is, the angle θ formed by the pressing axis L0m and the normal L2m to the pressing surface C2m will be described. The angle θ is preferably 10° or larger such that releasability of the optical surfaces Am and Dm perpendicular to the pressing surface C2m can be secured. In addition, the angle θ is more preferably 20° or larger. The angle θ is further preferably 30° or larger, and yet further preferably 40° or larger.

The upper limit value of the angle θ will be described. The angle θ is preferably 70° or smaller such that a projected area of the pressing surface C2m in the direction in which the pressing axis L0m extends can be secured. By setting a sufficiently large projection plane of the pressing surface C2m in the vertical direction Z in which the pressing axis L0m extends with respect to the prism 90, the pressing pressure can be stably transmitted to the material 9, and it becomes easier to guide the sink mark to the bottom surface C2 with high probability. In addition, the angle θ is more preferably 60° or smaller, and further preferably 50° or smaller.

As described above, the angle θ is preferably 10° to 70°, and it is more preferable when the lower limit value thereof is larger. In addition, it is more preferable that the upper limit value of the angle θ is smaller. From the viewpoint of mold releasability and the pressing pressure, the angle θ is most preferably 45°.

In addition, the prism 90 has a plurality of optical surfaces due to the characteristic of usage thereof. In the case where the optical surfaces and the non-optical surfaces are formed as flat surfaces, a non-optical surface is perpendicular to at least one optical surface in some case. In the case where the forming mold is formed such that the upper mold performs pressing in perpendicularly to the non-optical surface, a slide piece that slides in the horizontal direction is required for forming the optical surface perpendicular to the non-optical surface.

Regarding this, in the first exemplary embodiment, the material 9 is pressed by sliding the upper mold 53 in the direction inclined with respect to the normal L1m to the surface C1m of the body mold 52 as illustrated in FIG. 6C. As described above, since each forming surface is inclined with respect to the pressing axis L0m, a slide piece that slides in the horizontal direction is not needed. In addition, since the bottom surface C2 formed by the pressing surface C2m is also used as a surface for attracting a sink mark, a mechanism for guiding the sink mark does not have to be additionally provided in the forming mold 50. As a result of this, the configuration of the forming mold 50 is simple and compact.

Although a case where the prism 90 is a triangular prism has been described in the present exemplary embodiment, the type of the prism 90 is not limited to this. The present invention can be applied to a prism having a plurality of optical surfaces and at least one non-optical surface. Further, it is preferable when a non-optical surface is perpendicular to at least one optical surface in the prism.

Second Exemplary Embodiment

Figure 8A:
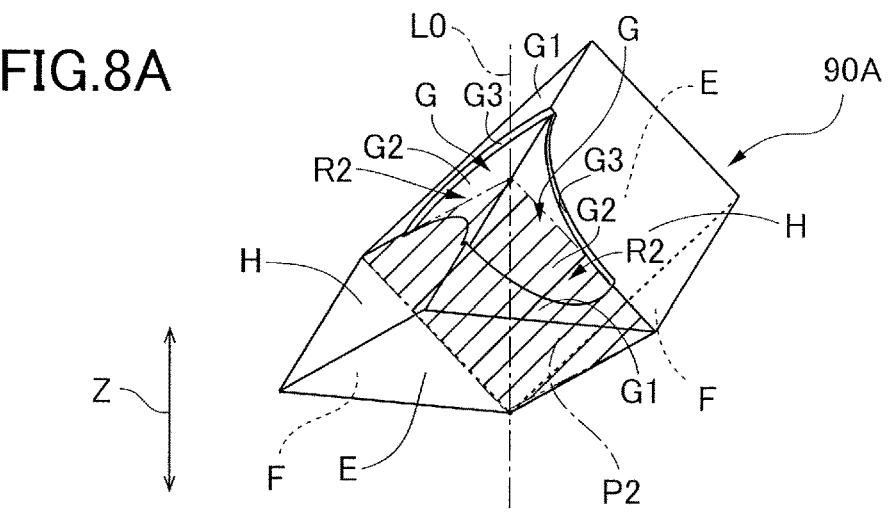
FIG. 8A is a perspective view of a prism according to a second exemplary embodiment.

A specific method for producing a prism according to a second exemplary embodiment will be described. FIG. 8A is a perspective view of a prism 90A according to the second exemplary embodiment. The prism 90A that is an optical element is mounted in an optical device such as binoculars or a camera. The prism 90A is, for example, a porro prism that is a four-surface prism having a shape in which two triangular prisms are joined together in a 90-degree twisted manner. The material of the prism 90A may be glass, but is thermoplastic resin that is lighter and requires lower cost than glass.

Figure 8B:
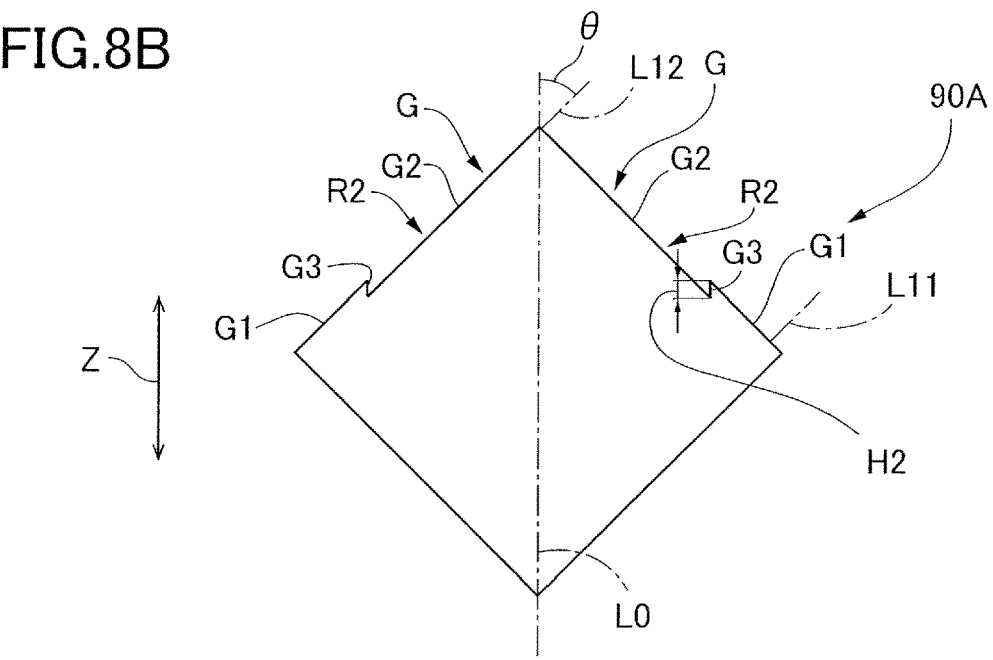
FIG. 8B is a section view of the prism according to the second exemplary embodiment.
Figure 8C:
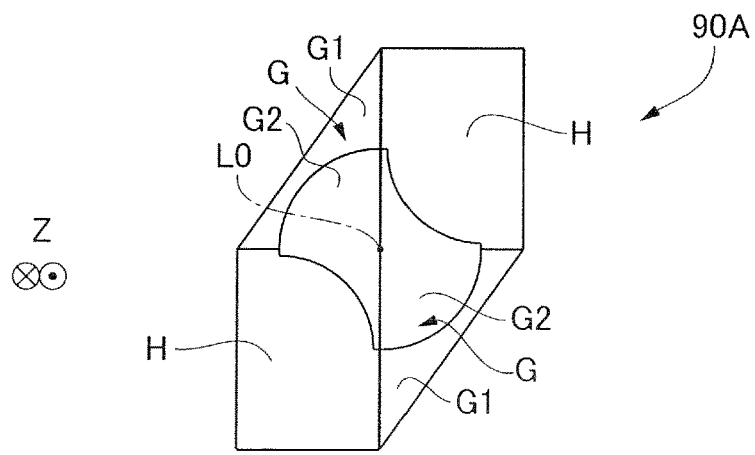
FIG. 8C is a plan view of the prism according to the second exemplary embodiment.

The prism 90A has a shape that is 180° rotation-symmetrical around the virtual axis L0. FIG. 8B is a section view of the prism 90A taken along a virtual plane P2 including the virtual axis L0 bisecting the prism 90A. FIG. 8C is a plan view of the prism 90A as viewed in the direction in which the virtual axis L0 extends.

The prism 90A includes two optical surfaces E, two non-optical surfaces F, two non-optical surfaces G, and two optical surfaces H. The non-optical surfaces G each include a base surface G1 that is a flat surface and a recess portion R2 recessed with respect to the base surface G1. The recess portion R2 includes a substantially flat bottom surface G2 and side wall surfaces G3. An angle formed by the two optical surfaces H is 90°, and an angle formed by an optical surface E and an optical surface H that are adjacent to each other is 45°. In addition, an angle formed by a non-optical surface F and the bottom surface G2 and the angle formed by an optical surface E and an optical surface H are 90°. In the second exemplary embodiment, bottom surfaces G2 respectively included in the plurality of non-optical surfaces G that are adjacent to each other are continuous via a ridgeline.

To be noted, the base surface G1 and the bottom surface G2 are parallel to each other. Therefore, a normal L11 to the base surface G1 and a normal L12 to the bottom surface G2 are parallel to each other. That is, the normals L11 and L12 extend in the same direction. An angle formed by the virtual axis L0 and each of the normals L11 and L12 will be referred to as an angle θ. There are two angles formed by the virtual axis L0 and each of the normals L11 and L12 that make up a total angle of 180°, that is, an acute angle and an obtuse angle, and the angle θ is the acute angle. The virtual axis L0 is a line that coincides with a pressing axis of the forming mold when the prism 90A is in the forming mold.

Figure 9:
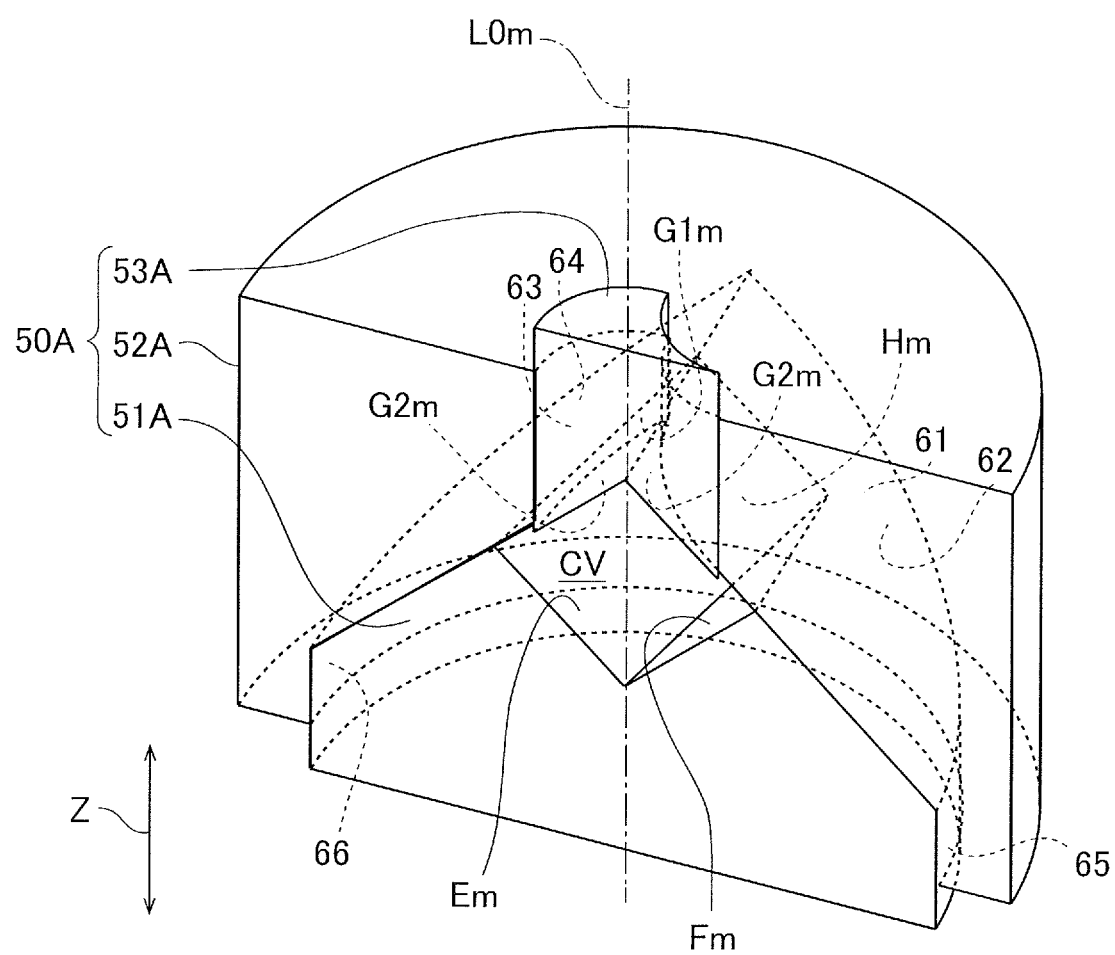
FIG. 9 is a perspective view of one of a pair of cut pieces into which a forming mold according to the second exemplary embodiment is cut.

The production system that produces the prism 90A is almost the same as the production system described in the first exemplary embodiment except for the forming mold. That is, the forming mold according to the second exemplary embodiment is different from that of the first exemplary embodiment. FIG. 9 is a perspective view of one of a pair of cut pieces into which a forming mold 50A according to the second exemplary embodiment is cut. FIG. 9 illustrates a case where the forming mold 50A is cut along a virtual plane that corresponds to a virtual plane P2 of FIG. 8A, includes the pressing axis L0m, and bisects the cavity CV. To be noted, in a state in which the prism 90A is disposed in the cavity CV of the forming mold 50A, the virtual axis L0 illustrated in FIG. 8A and the pressing axis L0m coincide with each other. The forming mold 50A of the pressing apparatus is a mold for forming a prism and includes a lower mold 51A serving as a first mold, a body mold 52A serving as a second mold, and an upper mold 53A serving as a third mold.

Figure 10A:
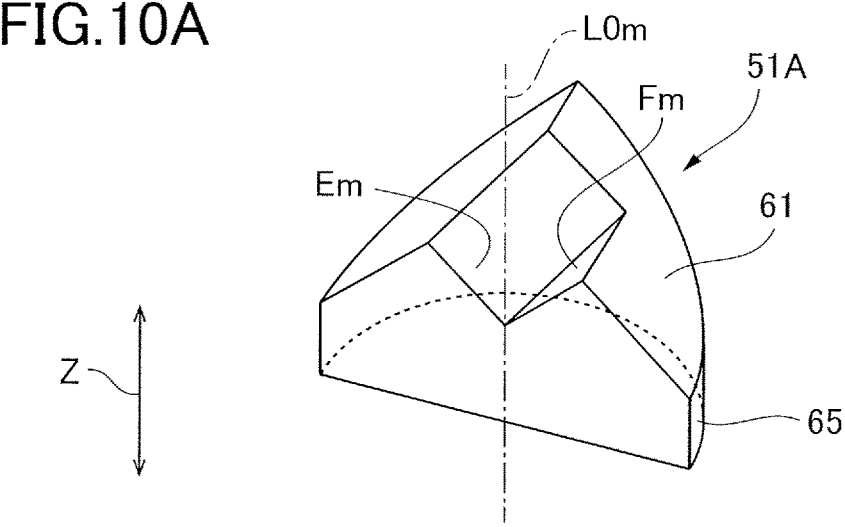
FIG. 10A is a perspective view of one of a pair of cut pieces into which a lower mold according to the second exemplary embodiment is cut.
Figure 10B:
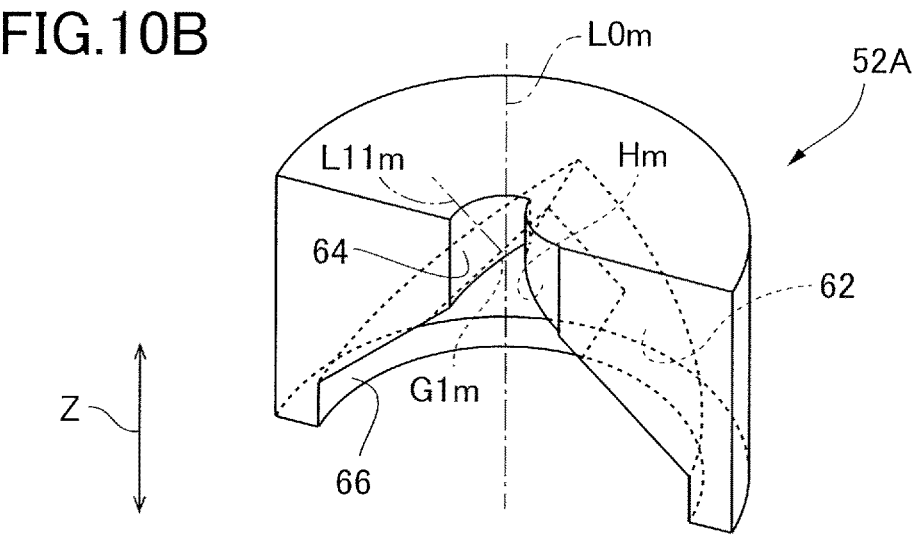
FIG. 10B is a perspective view of one of a pair of cut pieces into which a body mold according to the second exemplary embodiment is cut.
Figure 10C:
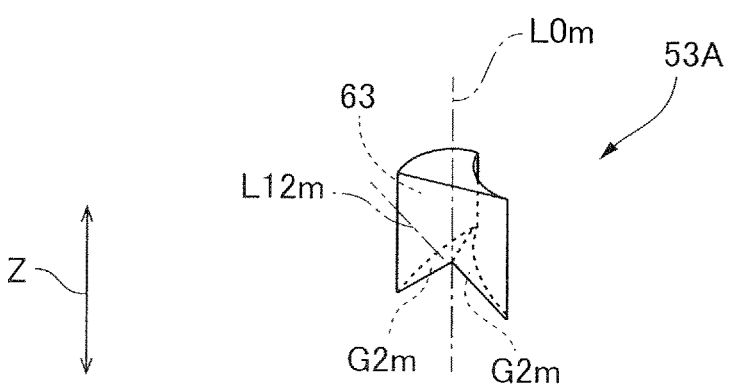
FIG. 10C is a perspective view of one of a pair of cut pieces into which an upper mold according to the second exemplary embodiment is cut.

FIG. 10A is a perspective view of one of a pair of cut pieces into which the lower mold 51A is cut. FIG. 10B is a perspective view of one of a pair of cut pieces into which the body mold 52A is cut. FIG. 10C is a perspective view of one of a pair of cut pieces into which the upper mold 53A is cut. Also in FIGS. 10A to 10C, each mold cut along the virtual plane is illustrated similarly to FIG. 9.

The lower mold 51A includes optical surfaces Em and non-optical surfaces Fm as illustrated in FIG. 10A. The optical surfaces Em form the optical surfaces E of the prism 90A, and the non-optical surfaces Fm form the non-optical surfaces F of the prism 90A. In addition, the lower mold 51A includes the abutting surface 61 and the slide contact surface 65 similarly to the first exemplary embodiment.

The body mold 52A includes optical surfaces Hm and surfaces G1m as illustrated in FIG. 10B. The optical surfaces Hm form the optical surfaces H of the prism 90A, and the surfaces G1m form the base surfaces G1 that are part of the non-optical surfaces G of the prism 90A. In addition, the body mold 52A includes the abutting surface 62, and slide contact surfaces 64 and 66 similarly to the first exemplary embodiment.

The upper mold 53A forms the recess portions R2 that are the other part of the non-optical surfaces G of the prism 90A, and are slidable in the vertical direction Z with respect to the body mold 52A. The upper mold 53A includes pressing surfaces G2m and the slide contact surface 63 continuous from the pressing surfaces G2m as illustrated in FIG. 10C. The pressing surfaces G2m form the bottom surfaces G2 of the recess portions R2. The periphery of the pressing surfaces G2m is formed by straight lines and arcs, and has such a shape that the slide contact surface 63 can be processed with a high precision.

As illustrated in FIG. 9, the slide contact surfaces 63, 64, 65, and 66 are surfaces extending in a direction parallel to the pressing axis L0m, that is, in the vertical direction Z similarly to the first exemplary embodiment. By moving the body mold 52A in the vertical direction Z with respect to the lower mold 51A, the slide contact surface 65 of the lower mold 51A and the slide contact surface 66 of the body mold 52A are brought into slide contact with each other. In addition, by moving the upper mold 53A in the vertical direction Z with respect to the body mold 52A, the slide contact surface 64 of the body mold 52A and the slide contact surface 63 of the upper mold 53A are brought into slide contact with each other. The abutting surface 62 is formed in such a shape as to overlap the abutting surface 61.

The body mold 52A comes into slide contact with the slide contact surface 65 of the lower mold 51A and slides in the vertical direction Z with respect to the lower mold 51A, and thus the axis of the body mold 52A is aligned with the pressing axis L0m. In addition, the body mold 52A is positioned in the vertical direction Z as a result of the abutting surface 62 abutting the abutting surface 61 of the lower mold 51A. The upper mold 53A comes into slide contact with the slide contact surface 64 of the body mold 52A and slides in the vertical direction Z with respect to the body mold 52A, and thus the axis of the upper mold 53A is aligned with the pressing axis L0m. In addition, by sliding the upper mold 53A with respect to the body mold 52A, pressing pressure is transmitted to the material through the pressing surfaces G2m, and thus the respective surfaces Em, Fm, Gm, and Hm are transferred.

The optical surfaces Em, the non-optical surfaces Fm, the surfaces G1m of the non-optical surfaces Gm, the pressing surfaces G2m, and the optical surfaces Hm are all inclined surfaces inclined with respect to the pressing axis L0m. That is, the surfaces G1m and the pressing surfaces G2m are inclined surfaces inclined with respect to the slide contact surface 63. In addition, the body mold 52A and the upper mold 53A are disposed such that the surfaces G1m and the pressing surfaces G2m are parallel. That is, normals L11m to the surfaces G1m and normals L12m to the surfaces G2m are parallel. In other words, the normals L11m and the normals L12m extend in the same direction. Angles formed by the pressing axis L0m and the normals L11m and L12m match the angle θ illustrated in FIG. 8B.

The two pressing surfaces G2m are continuous. In addition, by setting a sufficiently large projection plane of the pressing surfaces G2m in the vertical direction Z in which the pressing axis L0m extends with respect to the prism 90A, the pressing pressure can be stably transmitted to the material in the pressing step, and it becomes easier to guide sink marks to the bottom surfaces G2 with high probability. The normals L12m to the pressing surfaces G2m formed on the upper mold 53A are both inclined with respect to the pressing axis L0m. The optical surfaces Em, the non-optical surfaces Fm, and the optical surfaces Hm are also inclined with respect to the pressing axis L0m, and the cavity CV is thus defined.

To be noted, since each step of the method of producing the prism 90A is similar to the first exemplary embodiment, descriptions thereof will be omitted. Also according to the second exemplary embodiment, the prism 90A having smaller internal distortion can be obtained by press molding similarly to the first exemplary embodiment. As illustrated in FIG. 8A, the recess portions R2 recessed with respect to the base surfaces G1 are formed in the non-optical surfaces G of the prism 90A produced through the steps similar to the first exemplary embodiment. That is, in the forming mold 50A during press molding, the upper mold 53A projects with respect to the body mold 52A. Although the weight or the volume of the material slightly varies for each molded product, by forming the recess portions R2 by pressing part of the non-optical surfaces G, the variation of weight is absorbed as variation of the depth of the recess portions R2. Further, sink marks can be concentrated at the bottom surfaces G2 of the recess portions R2 in the non-optical surfaces G. Therefore, the variation of weight of the material does not affect the precision of the optical surfaces E and H of the prism 90A. That is, the optical surfaces E and H of the prism 90A can be formed with a high precision. As described above, the bottom surfaces G2 of the prism 90A to be formed are surfaces for attracting sink marks, and are slightly recessed in a concave shape. The amount of recess of the bottom surfaces G2 originating from the sink marks is about several μm.

A height H2 of the side wall surfaces G3 constituting the recess portions R2 in the vertical direction Z in which the virtual axis L0 extends will be described. The height H2 of the side wall surfaces G3 is preferably 0.05 mm or larger in consideration of the variation of weight of the material, rounding of edges to prevent chipping of the upper mold 53A, and preventing burr from formed on the non-optical surfaces G. Conversely, since the optically effective area and mold releasing resistance of the triangular prism is affected in the case where the height H2 of the side wall surfaces G3 is too large, the height H2 of the side wall surfaces G3 is preferably 5 mm or smaller. That is, the height H2 of the side wall surfaces G3 is preferably 0.05 mm to 5 mm, and more preferably 0.5 mm.

In the forming mold 50A, the amount of projection of the pressing surfaces G2m of the upper mold 53A with respect to the surfaces G1m of the body mold 52A in the direction in which the pressing axis L0m extends, that is, the downward direction may be 0.05 mm to 5 mm, for example, 0.5 mm.

A lower limit value of the angle θ formed by the virtual axis L0 and each of the normals L12 of the bottom surfaces G2, that is, the angle θ formed by the pressing axis L0m and each of the normals L12m of the pressing surfaces G2m will be described. The angle θ is preferably 10° or larger such that releasability of the pressing surfaces G2m and the optical surfaces Em and Hm perpendicular to the pressing surfaces G2m can be secured. In addition, the angle θ is more preferably 20° or larger. The angle θ is further preferably 30° or larger, and yet further preferably 40° or larger.

The upper limit value of the angle θ will be described. The angle θ is preferably 70° or smaller such that the projected area of the pressing surfaces G2m in the direction in which the pressing axis L0m extends can be secured. By setting a sufficiently large projection plane of the pressing surfaces G2m in the vertical direction Z in which the pressing axis L0m extends with respect to the prism 90A, the pressing pressure can be stably transmitted to the material, and it becomes easier to guide the sink marks to the bottom surfaces G2 with high probability. In addition, the angle θ is more preferably 60° or smaller, and further preferably 50° or smaller.

As described above, the angle θ is preferably 10° to 70°, and it is more preferable when the lower limit value thereof is larger. In addition, it is more preferable that the upper limit value of the angle θ is smaller. From the viewpoint of mold releasability and the pressing pressure, the angle θ is most preferably 45°.

In addition, in the second exemplary embodiment, the material is pressed by sliding the upper mold 53A in the direction inclined with respect to the normals L11m of the surfaces G1m of the body mold 52A. Since each forming surface is inclined with respect to the pressing axis L0m, a slide piece that slides in the horizontal direction is not needed. In addition, since the bottom surfaces G2 formed by the pressing surfaces G2m are also used as surfaces for attracting the sink marks, a mechanism for guiding the sink marks does not have to be additionally provided in the forming mold 50A. As a result of this, the configuration of the forming mold 50A is simple and compact.

In the second exemplary embodiment, the bottom surfaces G2 included in the respective adjacent non-optical surfaces G are continuous via a ridgeline through which the virtual axis L0 passes. In the forming mold 50A, the pressing surfaces G2m are continuous via a ridge line through which the pressing axis L0m passes. By setting a sufficiently large projection plane of the pressing surfaces G2m in the vertical direction Z in which the pressing axis L0m extends with respect to the prism 90A, the pressing pressure can be stably transmitted to the material in the pressing step, and it becomes easier to guide the sink marks to the bottom surfaces G2 with high probability.

To be noted, since the normals L12m of the pressing surfaces G2m are both inclined by 45° with respect to the pressing axis L0m, the side wall surfaces G3 forming the recess portions R2 are inclined by 45° with respect to the base surfaces G1 of the non-optical surfaces G. In addition, since part of slide contact surfaces 63 of the upper mold 53A is transferred as the side wall surfaces G3, the side wall surfaces G3 opposed to each other are parallel.

Third Exemplary Embodiment

Next, an exemplary embodiment of an optical device including the prism according to the first exemplary embodiment or the second exemplary embodiment will be described. Binoculars will be described as an example of the optical device herein.

Figure 11:
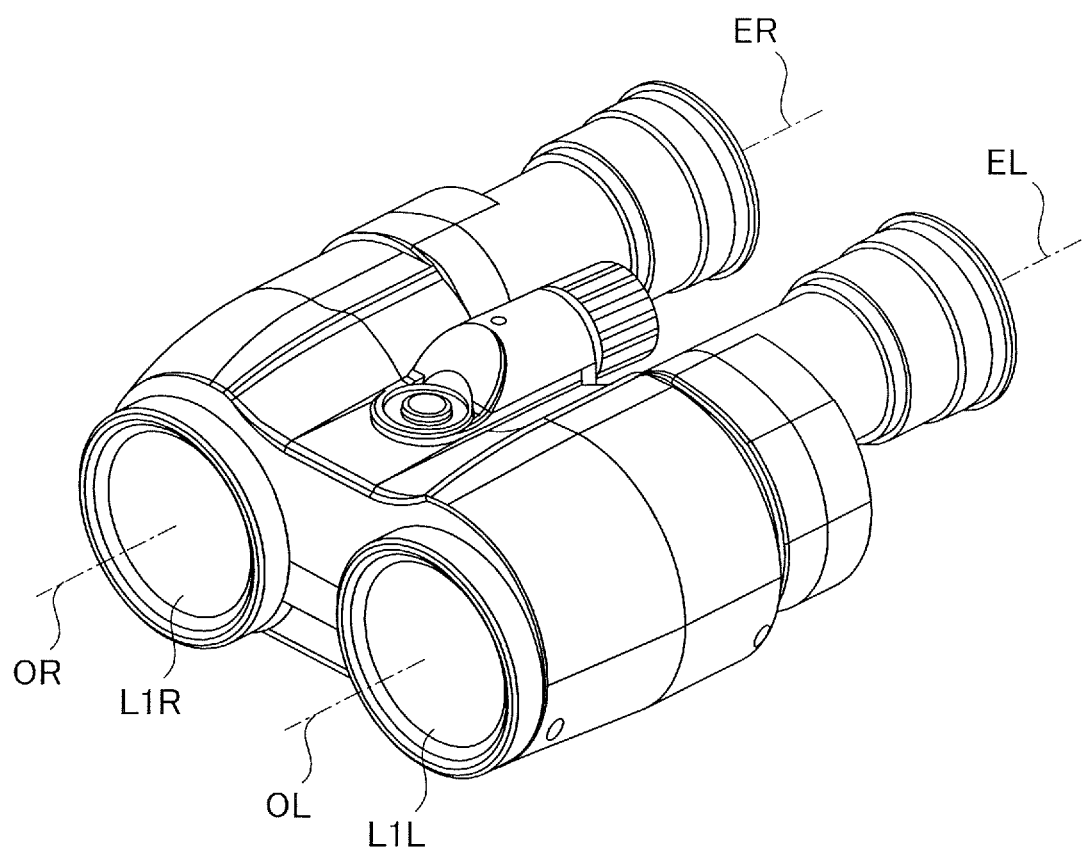
FIG. 11 is a perspective view of binoculars according to a third exemplary embodiment

FIG. 11 is a perspective view of the binoculars that are an exemplary embodiment of the present invention illustrating the appearance thereof. A one-dot chain line OL indicates an optical axis of an objective optical system on the left, and a one-dot chain line OR indicates an optical axis of an objective optical system on the right. A one-dot chain line EL indicates an optical axis of an ocular optical system on the left, and a one-dot chain line ER indicates an optical axis of an ocular optical system on the right. Here, the left and the right respectively correspond to the left eye and the right eye that observe an object through the binoculars.

In addition, FIG. 11 illustrates a state in which the distance between the optical axes OL and OR of the left and right objective optical systems and the distance between the optical axes EL and ER of the left and right ocular optical systems are equal.

Figure 12:
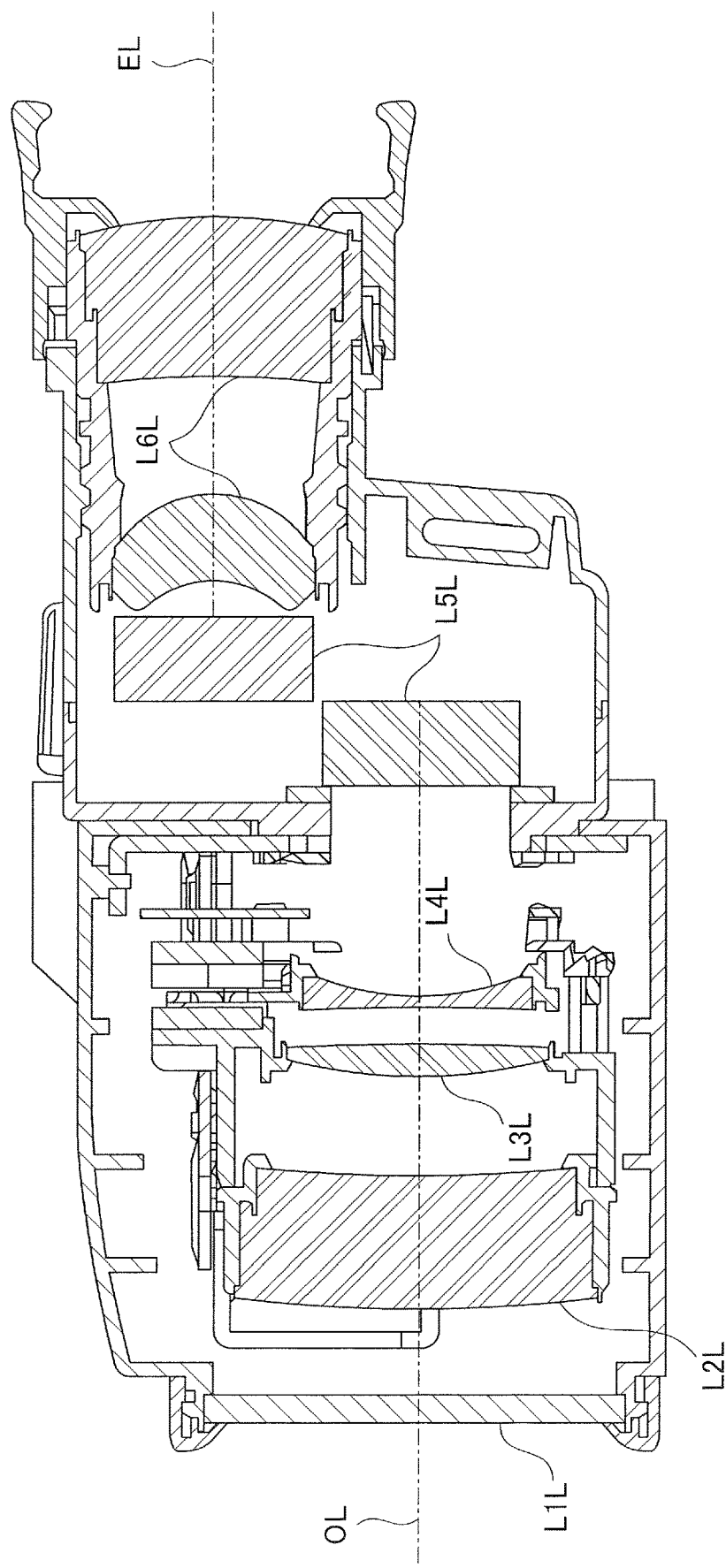
FIG. 12 is a section view of a left optical system of the binoculars according to the third exemplary embodiment.

FIG. 12 illustrates a section of the binoculars in the state of FIG. 11 taken along a plane including the optical axis OL of the left objective optical system and the optical axis EL of the left ocular optical system.

First, the left and right optical systems provided in the binoculars will be described. The binoculars include left and right protective glasses L1L and L1R, left and right front lenses L2L and L2R, left and right fixed lenses L3L and L3R, and left and right movable lenses L4L and L4R. The left and right movable lenses L4L and L4R serve as vibration-proof lenses respectively constituted by part or the whole of the left and right objective optical systems. The lenses L2L, L3L, and L4L constitutes the left objective optical system, and the lenses L2R, L3R, and L4R constitute the right objective optical system. In this manner, the left and right objective optical systems are constituted.

Left and right porro III-type prisms L5L and L5R respectively constitute left and right erecting optical systems. Left and right ocular lenses L6L and L6R respectively constitute the left and right ocular optical systems. The optical axis of the left ocular lens L6L coincides with the optical axis EL of the left ocular optical system, and the optical axis of the right ocular lens L6R coincides with the optical axis ER of the right ocular optical system. As described above, left and right observation optical systems are constituted. To be noted, the lenses L2R, L3R, L4R, L5R, and L6R of the optical systems on the right are not illustrated because these lenses are at positions that are invisible in FIGS. 11 and 12.

In the binoculars of the present exemplary embodiment, prisms in which sink marks are guided to the recess portions and which thus have highly precise optical surfaces are used as the porro II-type prisms L5L and L5R of the left and right erecting optical systems. Therefore, in the binoculars of the present exemplary embodiment, the left and right erecting optical systems have high precision and high uniformity, and is thus extremely high performance.

To be noted, the present invention is not limited to the exemplary embodiments described above, and can be modified in various ways within the technical concept of the present invention. In addition, according to the exemplary embodiments, a prism having a highly precise optical surface can be obtained.

Although a case where the thermoplastic resin is a COP resin has been described in the exemplary embodiment described above, the thermoplastic resin is not limited to this. For example, the thermoplastic resin may be a material such as a polycarbonate resin, a polymethyl methacrylate resin, a cyclo-olefin copolymer resin, or a methyl methacrylate-styrene copolymer resin. In addition, any other resin may be used as long as the resin is a thermoplastic resin and can be used for the prism.

In addition, although a case where a sink mark is guided to the pressing surface C2m that is a non-optical surface by cooling the material 9 with temperature difference between the lower mold 51, the body mold 52, and the upper mold 53 has been described in the first exemplary embodiment described above, the configuration is not limited to this. For example, the sink mark may be guided by separating the upper mold 53 from the forming mold 50 while cooling the forming mold 50 to insulate and free the pressing surface C2m. The same applies to the second exemplary embodiment.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-183030, filed Sep. 22, 2017, and Japanese Patent Application No. 2018-157415, filed Aug. 24, 2018, which are hereby incorporated by reference herein in their entirety.

What is claimed is:

1. A method of producing a prism comprising an optical surface and a non-optical surface, the method comprising:
a first step of sandwiching a material by a first mold and a second mold, the second mold comprising a surface configured to form a base surface of the non-optical surface;
a second step of pressing the material by causing a third mold to project toward the material with respect to the surface of the second mold configured to form the base surface, the third mold being configured to form a recess portion recessed with respect to the base surface; and
a third step of cooling the material.

2. The method according to claim 1, wherein, in the third step, a temperature difference is imparted such that a temperature of the third mold is higher than a temperature of the first mold and a temperature of the second mold in a cooling process of the material.

3. The method according to claim 1, wherein, in the second step, the material is pressed by sliding the third mold with respect to the second mold in a direction inclined with respect to a direction of a normal to the surface of the second mold configured to form the base surface.

4. The method according to claim 3, wherein the third mold comprises a slide contact surface and an inclined surface, the slide contact surface being configured to come into slide contact with the second mold, the inclined surface being inclined with respect to the slide contact surface, and
wherein, in the second step, the material is pressed by causing a part of the slide contact surface and whole of the inclined surface to project toward the material with respect to the surface of the second mold configured to form the base surface in a state in which the inclined surface is parallel to the surface configured to form the base surface.

5. The method according to claim 4, wherein at least one of the first mold and the second mold comprises a surface configured to form the optical surface, and
wherein, in the second step, the material is pressed in a state in which the inclined surface is perpendicular to the surface configured to form the optical surface.

6. The method according to claim 1, further comprising a fourth step of opening the first mold, the second mold, and the third mold,
wherein, in the fourth step, the second mold is separated from the material after the third mold is separated from the material.

7. The method according to claim 1, wherein the material is a thermoplastic resin.

8. A forming mold for forming a prism by press molding, the prism comprising an optical surface and a non-optical surface, the forming mold comprising:
a first mold;
a second mold that comprises a surface configured to form a base surface of the non-optical surface of the prism and is configured to define, together with the first mold, a space in which a material is disposed; and
a third mold that is slidable with respect to the second mold so as to project toward the space with respect to the second mold and is configured to form a recess portion recessed with respect to the base surface.

* * * * *